United States Patent
McLaughlin

(10) Patent No.: US 10,789,680 B2
(45) Date of Patent: *Sep. 29, 2020

(54) GENERATING AN ENHANCED IMAGE OF A PREDETERMINED SCENE FROM A PLURALITY OF IMAGES OF THE PREDETERMINED SCENE

(71) Applicant: Google Technology Holdings LLC, Mountain View, CA (US)

(72) Inventor: Michael D. McLaughlin, San Jose, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/195,377

(22) Filed: Nov. 19, 2018

(65) Prior Publication Data

US 2019/0108619 A1    Apr. 11, 2019

Related U.S. Application Data

(62) Division of application No. 15/272,925, filed on Sep. 22, 2016, now Pat. No. 10,134,111, which is a
(Continued)

(51) Int. Cl.
*G06T 7/20*    (2017.01)
*G06T 3/40*    (2006.01)
(Continued)

(52) U.S. Cl.
CPC ............. *G06T 3/4069* (2013.01); *G06T 5/00* (2013.01); *G06T 7/20* (2013.01); *G06T 7/30* (2017.01);
(Continued)

(58) Field of Classification Search
CPC ...... G06K 9/6202; G06K 9/6203; G06K 9/00; G06T 3/4069; G06T 7/001; G06F 17/30256
(Continued)

(56) References Cited

U.S. PATENT DOCUMENTS 6,985,156 B2   1/2006 Wang et al.
7,428,019 B2   9/2008 Irani
(Continued)

OTHER PUBLICATIONS

Photoacute, "Almalence", http://photoacute.com/studio/, Apr. 22, 2014, 3 pages.
(Continued)

*Primary Examiner* — Sheela C Chawan
(74) *Attorney, Agent, or Firm* — IP Spring

(57) ABSTRACT

A method, device, system, and article of manufacture are provided for generating an enhanced image of a predetermined scene from images. In one embodiment, a method comprises receiving, by a computing device, a first indication associated with continuous image capture of a predetermined scene being enabled; in response to the continuous image capture being enabled, receiving, by the computing device, from an image sensor, a reference image and a first image, wherein each of the reference image and the first image is of the predetermined scene and has a first resolution; determining an estimated second resolution of an enhanced image of the predetermined scene using the reference image and the first image; and in response to the continuous image capture being disabled determining the enhanced image using the reference image and the first image, wherein the enhanced image has a second resolution that is at least the first resolution and about the estimated second resolution.

20 Claims, 8 Drawing Sheets

Related U.S. Application Data division of application No. 14/269,762, filed on May 5, 2014, now Pat. No. 9,478,010.

(60) Provisional application No. 61/915,286, filed on Dec. 12, 2013.

(51) Int. Cl.
  *G06T 7/30* (2017.01)
  *G06T 5/00* (2006.01)
  *G06T 11/60* (2006.01)

(52) U.S. Cl.
  CPC .... *G06T 11/60* (2013.01); *G06T 2207/20172* (2013.01); *G06T 2207/20221* (2013.01)

(58) Field of Classification Search
  USPC ....................................................... 382/299
  See application file for complete search history.

(56) References Cited

U.S. PATENT DOCUMENTS

| | | | |
|---|---|---|---|
| 7,933,464 B2 | 4/2011 | Zhang | |
| 8,130,278 B2 | 3/2012 | Border | |
| 8,326,069 B2 | 12/2012 | Maslov et al. | |
| 8,682,109 B2 | 3/2014 | Kang et al. | |
| 8,711,231 B2 | 4/2014 | Chuang et al. | |
| 8,724,928 B2 | 5/2014 | Deever | |
| 8,878,950 B2 | 11/2014 | Lelescu et al. | |
| 8,896,728 B2 | 11/2014 | Fujii | |
| 9,177,381 B2 | 11/2015 | McKinnon | |
| 10,134,111 B2 * | 11/2018 | McLaughlin | G06T 3/4069 |
| 2004/0008269 A1 | 1/2004 | Zomet et al. | |
| 2006/0002635 A1 | 1/2006 | Nestares et al. | |
| 2009/0123082 A1 | 5/2009 | Atanssov et al. | |
| 2013/0038771 A1 | 2/2013 | Brunner et al. | |

OTHER PUBLICATIONS

USPTO, First Action Interview, Office Action Summary for U.S. Appl. No. 15/272,925, dated Jan. 31, 2018, 14 pages.

USPTO, Notice of Allowance for U.S. Appl. No. 15/272,925, dated Jul. 19, 2018, 15 pages.

USPTO, First Action Interview, Pre-Interview Communication for U.S. Appl. No. 15/272,925, dated Oct. 6, 2017, 10 pages.

* cited by examiner

GENERATING AN ENHANCED IMAGE OF A PREDETERMINED SCENE FROM A PLURALITY OF IMAGES OF THE PREDETERMINED SCENE

CROSS REFERENCE TO PRIOR APPLICATION(S)

This application claims priority and benefit under 35 U.S.C. § 119(e) from U.S. Provisional Application No. 61/915,286, filed Dec. 12, 2013 of U.S. Ser. No. 15/272,925, filed on Sep. 22, 2016, now patent 10,134,111 entitled "GENERATING AN ENHANCED IMAGE OF A PREDETERMINED SCENE FROM A PLURALITY OF IMAGES OF THE PREDETERMINED SCENE". The 925 application claims priority to U.S. Provisional patent application Ser. No. 14/269,762, filed on May 5, 2014, now U.S. Pat. No. 9,478,010 entitled "GENERATING AN ENHANCED IMAGE OF A PREDETERMINED SCENE FROM A PLURALITY OF IMAGES OF THE PREDETERMINED SCENE". Both of which are incorporated herein by reference in their entirety for all purposes.

FIELD OF USE

The embodiments described herein relate to generating higher resolution images and more particularly to generating an enhanced image of a predetermined scene from plurality of images of the predetermined scene.

BACKGROUND

Images with higher resolutions are typically considered more desirable. An enhanced image shows greater detail than a lower resolution image of the same scene. Super-resolution image processing uses multiple lower resolution images of a scene to generate an enhanced image of the scene. The multiple lower resolution images may be captured by the same camera and may represent different views of the same scene. The enhanced image may be generated by aligning and combining the multiple lower resolution images so that additional image information is obtained. Since super-resolution image processing is computationally intensive, super-resolution image processing has been typically applied in industrial applications such as medical imaging, face recognition, computer vision and satellite imaging.

BRIEF DESCRIPTION OF THE FIGURES

The present disclosure is illustrated by way of examples, embodiments and the like and is not limited by the accompanying figures, in which like reference numbers indicate similar elements. Elements in the figures are illustrated for simplicity and clarity and have not necessarily been drawn to scale. The figures along with the detailed description are incorporated and form part of the specification and serve to further illustrate examples, embodiments and the like, and explain various principles and advantages, in accordance with the present disclosure, where.

DETAILED DESCRIPTION

Figure 1:
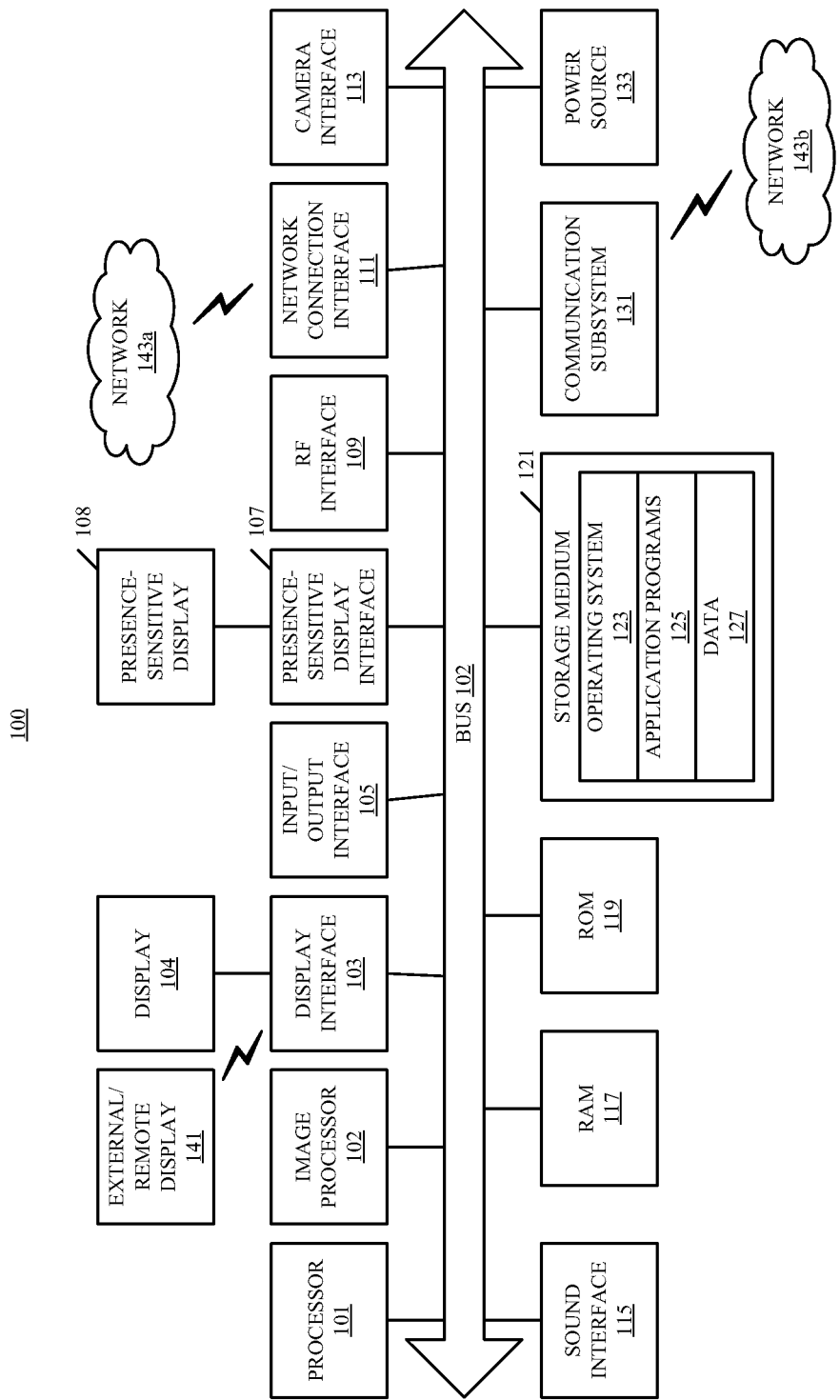
FIG. 1 is a block diagram illustrating one embodiment of a computing device in accordance with various aspects set forth herein.

This disclosure provides example methods, devices (or apparatuses), systems, or articles of manufacture for generating an enhanced image of a predetermined scene from a plurality of images of the predetermined scene. By configuring a computing device in accordance with various aspects described herein, increased usability of the computing device is provided. For example, a user may position a camera in preparation to capture a scene and then may press and hold a button of the camera to capture the scene. While the button is depressed, the camera may continuously capture images of the scene. Further, while the button is depressed, the camera may display an estimated resolution of an enhanced image associated with the captured images of the scene. Once the user releases the button, the camera may no longer capture images of the scene and may generate an enhanced image from the captured images. The enhanced image may have a resolution that is about the estimated resolution.

In another example, a user may enable a super-resolution image mode of a smartphone. While in super-resolution image mode, in response to the user taking a picture of a scene using the smartphone, the camera may continuously capture images of the scene until an estimated resolution of an enhanced image associated with the captured images of the scene is reached. Once the estimated resolution of the enhanced image is reached, the smartphone may generate an enhanced image using the captured images. The enhanced image may have a resolution that is about the estimated resolution.

In another example, while capturing a burst of images of a scene, a tablet computer may select one of the captured images as a reference image of the scene. Further, the tablet computer may determine a sub-pixel motion vector for each captured image relative to the reference image. For any captured images having the same sub-pixel motion vector, the tablet computer may select one of these captured images and may remove the others. The tablet computer may then generate an enhanced image from the remaining captured images.

In another example, while capturing a burst of images of a scene, a wearable device may select one of the captured images as a reference image of the scene. Further, the wearable device may determine a sub-pixel motion vector for each captured image relative to the reference image. For any captured image having a sub-pixel motion vector that is associated with motion of subject matter in the scene, the wearable device may remove such captured image or may no longer capture images of the scene. The wearable device may then generate an enhanced image from the remaining captured images.

In another example, an image processor may receive captured images of a scene including a reference image of the scene. The image processor may determine a sub-pixel motion vector for each captured image relative to the reference image. For any captured images having the same sub-pixel motion vector, the image processor may select one of these captured images and may remove the others. The image processor may then align and combine the captured images using their sub-pixel motion vectors to form an enhanced image. Further, the image processor may perform interpolation on any empty sub-pixel locations of the enhanced image.

A presence-sensitive input device as discussed herein, may be a device that accepts input by the proximity of a finger, a stylus or an object near the device, detects gestures without physically touching the device, or detects eye or eye lid movements or facial expressions of a user operating the device. Additionally, a presence-sensitive input device may be combined with a display to provide a presence-sensitive display. In one example, a user may provide an input to a computing device by touching the surface of a presence-sensitive display using a finger. In another example, a user may provide input to a computing device by gesturing without physically touching any object. In another example, a gesture may be received via a digital camera, a digital video camera, or a depth camera. In another example, an eye or eye lid movement or a facial expression may be received using a digital camera, a digital video camera or a depth camera and may be processed using eye tracking technology, which may determine a gaze location on a display or a virtual display. In some instances, the eye tracking technology may use an emitter operationally coupled to a computing device to produce infrared or near-infrared light for application to one or both eyes of a user of the computing device. In one example, the emitter may produce infrared or near-infrared non-collimated light. A person of ordinary skill in the art will recognize various techniques for performing eye tracking.

In some instances, a presence-sensitive display can have two main attributes. First, it may enable a user to interact directly with what is displayed, rather than indirectly via a pointer controlled by a mouse or touchpad. Secondly, it may allow a user to interact without requiring any intermediate device that would need to be held in the hand. Such displays may be attached to computers, or to networks as terminals. Such displays may also play a prominent role in the design of digital appliances such as the personal digital assistant (PDA), satellite navigation devices, mobile phones, video games, and wearable devices such as a pair of glasses having a virtual display or a watch. Further, such displays may include a capture device and a display.

According to one example implementation, the terms computing device or mobile computing device, as used herein, may be a central processing unit (CPU), controller or processor, or may be conceptualized as a CPU, controller or processor (for example, the processor 101 of FIG. 1). In yet other instances, a computing device play be a CPU, controller or processor combined with one or more additional hardware components. In certain example implementations, the computing device operating as a CPU, controller or processor may be operatively coupled with one or more peripheral devices, such as a display, navigation system, stereo, entertainment center, Wi-Fi access point, or the like. In another example implementation, the term computing device or portable computing device, as used herein, may refer to a mobile communication device, such as a smartphone, mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, wearable device or some other like terminology. In one example, the computing device may output content to its local display or virtual display, or speaker(s). In another example, the computing device may output content to an external display device (e.g., over Wi-Fi) such as a TV, a virtual display of a wearable device, or an external computing device.

FIG. 1 is a block diagram illustrating one embodiment of a computing device 100 in accordance with various aspects set forth herein. In FIG. 1, the computing device 100 may be configured to include a processor 101, which may also be referred to as a computing device, that is operatively coupled to an image processor 102, a display interface 103, an input/output interface 105, a presence-sensitive display interface 107, a radio frequency (RF) interface 109, a network connection interface 111, a camera interface 113, a sound interface 115, a random access memory (RAM) 117, a read only memory (ROM) 119, a storage medium 121, an operating system 123, an application program 125, data 127, a communication subsystem 131, a power source 133, another element, or any combination thereof. In FIG. 1, the processor 101 may be configured to process computer instructions and data. The processor 101 may be configured to be a computer processor or a controller. For example, the processor 101 may include two computer processors. In one definition, data is information in a form suitable for use by a computer. It is important to note that a person having ordinary skill in the art will recognize that the subject matter of this disclosure may be implemented using various operating systems or combinations of operating systems. The image processor 102 may be configured to perform digital image processing on digital image data. The image processor 102 may perform digital image processing such as discrete cosine transforms, inverse discrete cosine transforms, classification, feature extraction, pattern recognition, projection, multi-scale signal analysis, pixilation, filtering, component analysis, Markov models, anisotropic diffusion, interpolation such as bilinear interpolation and bicubic interpolation, oversampling, motion estimation, motion compensation, or the like. Further, the image processor 102 may be configured to perform digital video processing on digital video data. The image processor 102 may perform digital video processing such as deinterlacing, aspect ratio control, digital zoom and pan, brightness, contrast, hue, saturation, sharpness and gamma adjustments, frame rate conversion, color point conversion, color space conversion, noise reduction, detail enhancement, edge enhancement, motion compensation, color calibration, or the like the like. Further, the image processor 102 may perform various video encoding and decoding algorithms such as MPEG-1, MPEG-2, MPEG-4, H.264, DivX, or the like. Also, the image processor 102 may be configured to perform the functions of a graphics processing unit (GPU) such as three-dimensional computer graphics, texture mapping, polygon rendering, geometric calculations, shading, aliasing, or the like.

In FIG. 1, the display interface 103 may be configured as a communication interface and may provide functions for rendering video, graphics, images, text, other information, or any combination thereof on a display 104. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof. In one example, the display interface 103 may be operatively coupled to display 104 such as a touch-screen display associated with a mobile device or a virtual display associated with a wearable device. In another example, the display interface 103 may be configured to provide video, graphics, images, text, other information, or any combination thereof for an external/remote display 141 that is not necessarily connected to the computing device. In one example, a desktop monitor may be utilized for mirroring or extending graphical information that may be presented on a mobile device. In another example, the display interface 103 may wirelessly communicate, for example, via the network connection interface 111 such as a Wi-Fi transceiver to the external/remote display 141.

In the current embodiment, the input/output interface 105 may be configured to provide a communication interface to an input device, output device, or input and output device. The computing device 100 may be configured to use an output device via the input/output interface 105. A person of ordinary skill will recognize that an output device may use the same type of interface port as an input device. For example, a USB port may be used to provide input to and output from the computing device 100. The output device may be a speaker, a sound card, a video card, a display, a monitor, a printer, an actuator, an emitter, a smartcard, another output device, or any combination thereof. In one example, the emitter may be an infrared emitter. In another example, the emitter may be an emitter used to produce infrared or near-infrared non-collimated light, which may be used for eye tracking. The computing device 100 may be configured to use an input device via the input/output interface 105 to allow a user to capture information into the computing device 100. The input device may include a mouse, a trackball, a directional pad, a trackpad, a presence-sensitive input device, a presence-sensitive display, a scroll wheel, a digital camera, a digital video camera, a web camera, a microphone, a sensor, a smartcard, and the like. The presence-sensitive input device may include a sensor, or the like to sense input from a user. The presence-sensitive input device may be combined with a display to form a presence-sensitive display. Further, the presence-sensitive input device may be coupled to the computing device. The sensor may be, for instance, a digital camera, a digital video camera, a depth camera, a web camera, a microphone, an accelerometer, a gyroscope, a tilt sensor, a force sensor, a magnetometer, an optical sensor, a proximity sensor, another like sensor, or any combination thereof. For example, the input device 115 may be an accelerometer, a magnetometer, a digital camera, a microphone, and an optical sensor. An image sensor may be a digital camera, a digital video camera, a depth camera, a web camera, an optical sensor, an active pixel sensor, or the like.

In FIG. 1, the presence-sensitive display interface 107 may be configured to provide a communication interface to a pointing device or a presence-sensitive display 108 such as a touch screen. In one definition, a presence-sensitive display is an electronic visual display that may detect the presence and location of a touch, a gesture, an eye or eye lid movement, a facial expression or an object associated with its display area. The RF interface 109 may be configured to provide a communication interface to RF components such as a transmitter, a receiver, and an antenna. The network connection interface 111 may be configured to provide a communication interface to a network 143a. The network 143a may encompass wired and wireless communication networks such as a local-area network (LAN), a wide-area network (WAN), a computer network, a wireless network, a telecommunications network, another like network or any combination thereof. For example, the network 143a may be a cellular network, a Wi-Fi network, and a near-field network. As previously discussed, the display interface 103 may be in communication with the network connection interface 111, for example, to provide information for display on a remote display that is operatively coupled to the computing device 100. The camera interface 113 may be configured to provide a communication interface and functions for capturing digital images or video from a camera. The sound interface 115 may be configured to provide a communication interface to a microphone or speaker.

In this embodiment, the RAM 117 may be configured to interface via the bus 102 to the processor 101 to provide storage or caching of data or computer instructions during the execution of software programs such as the operating system, application programs, and device drivers. In one example, the computing device 100 may include at least one hundred and twenty-eight megabytes (128 Mbytes) of RAM. The ROM 119 may be configured to provide computer instructions or data to the processor 101. For example, the ROM 119 may be configured to be invariant low-level system code or data for basic system functions such as basic input and output (I/O), startup, or reception of keystrokes from a keyboard that are stored in a non-volatile memory. The storage medium 121 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives. In one example, the storage medium 121 may be configured to include an operating system 123, an application program 125 such as a web browser application, a widget or gadget engine or another application, and a data file 127.

In FIG. 1, the computing device 101 may be configured to communicate with a network 143b using the communication subsystem 131. The network 143a and the network 143b may be the same network or networks or different network or networks. The communication functions of the communication subsystem 131 may include data communication, voice communication, multimedia communication, short-range communications such as Bluetooth, near-field communication, location-based communication such as the use of the global positioning system (GPS) to determine a location, another like communication function, or any combination thereof. For example, the communication subsystem 131 may include cellular communication, Wi-Fi communication, Bluetooth communication, and GPS communication. The network 143b may encompass wired and wireless communication networks such as a local-area network (LAN), a wide-area network (WAN), a computer network, a wireless network, a telecommunications network, another like network or any combination thereof. For example, the network 143b may be a cellular network, a Wi-Fi network, and a near-field network. The power source 133 may be configures to provide an alternating current (AC) or direct current (DC) power to components of the computing device 100.

In FIG. 1, the storage medium 121 may be configured to include a number of physical drive units, such as a redundant array of independent disks (RAID), a floppy disk drive, a flash memory, a USB flash drive, an external hard disk drive, thumb drive, pen drive, key drive, a high-density digital versatile disc (HD-DVD) optical disc drive, an internal hard disk drive, a Blu-Ray optical disc drive, a holographic digital data storage (HDDS) optical disc drive, an external mini-dual in-line memory module (DIMM) synchronous dynamic random access memory (SDRAM), an external micro-DIMM SDRAM, a smartcard memory such as a subscriber identity module or a removable user identity (SIM/RUIM) module, other memory, or any combination thereof. The storage medium 121 may allow the computing device 100 to access computer-executable instructions, application programs or the like, stored on transitory or non-transitory memory media, to off-load data, or to upload data. An article of manufacture, such as one utilizing a communication system may be tangibly embodied in storage medium 122, which may comprise a computer-readable medium.

Figure 2:
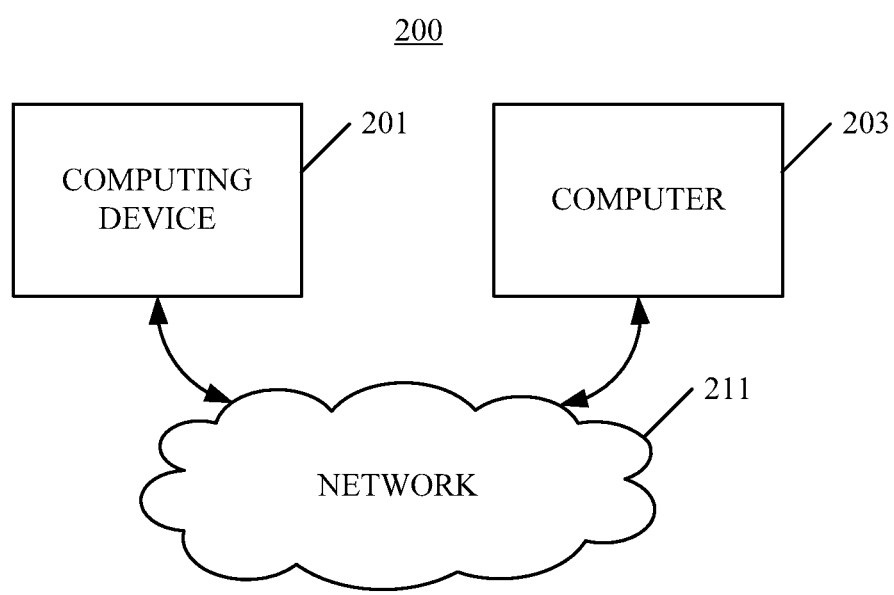
FIG. 2 illustrates one embodiment of a system for generating an enhanced image of a predetermined scene from a plurality of images of the predetermined scene with various aspects described herein.

FIG. 2 illustrates one embodiment of a system 200 for generating an enhanced image of a predetermined scene from a plurality of images of the predetermined scene with various aspects described herein. In FIG. 2, the system 200 may be configured to include a computing device 201, a computer 203, and a network 211. The computer 203 may be configured to process requests or provide data to the computing device 201 over a network 211. The computer 203 may be configured to include a computer software system. In one example, the computer 203 may be a computer software system executing on a computer hardware system. The computer 203 may execute one or more services. Further, the computer 203 may include one or more computer programs running to serve requests or provide data to local computer programs executing on the computer 203 or remote computer programs executing on the computing device 201. The computer 203 may be capable of performing functions associated with a server such as a database server, a file server, a mail server, a print server, a web server, a gaming server, the like, or any combination thereof, whether in hardware or software. In one example, the computer 203 may be a web server. In another example, the computer 203 may be a file server. Also, the computer 203 may be capable of performing image processing functions.

In FIG. 2, the network 211 may include wired or wireless communication networks such as a local-area network (LAN), a wide-area network (WAN), a computer network, a wireless network, a telecommunications network, the like or any combination thereof. In one example, the network 211 may be a cellular network, a Wi-Fi network, and the Internet. The computing device 201 may communicate with the computer 203 using the network 211. The computing device 201 may refer to a mobile communication device such as a smartphone, a mobile station (MS), a terminal, a cellular phone, a cellular handset, a personal digital assistant (PDA), a wireless phone, an organizer, a handheld computer, a desktop computer, a laptop computer, a tablet computer, a set-top box, a television, an appliance, a game device, a medical device, a display device, a wearable device, or the like.

In one embodiment, the computing device 201 may receive a first indication associated with continuous image capture of a predetermined scene being enabled. In one example, the continuous image capture of the predetermined scene may be associated with capturing sequential images of the predetermined scene. In another example, the predetermined scene may be associated with a user positioning the computing device 201 so that an image sensor of the computing device 201 may capture plurality of images. In response to the continuous image capture of the predetermined scene being enabled, the computing device 201 may capture a current image of a plurality of images of the predetermined scene. In one example, a user of the computing device 201 may be holding the computing device 201 while the plurality of images of the predetermined scene are captured. Each of the plurality of images may have a first resolution. Further, each of the plurality of images may be a raw image. In one example, the first resolution may be associated with a resolution of the image sensor.

Furthermore, the computing device 201 may update an estimated second resolution of an enhanced image of the predetermined scene using the current image of the plurality of images. In one example, the computing device 201 may update the estimated second resolution of the enhanced image by increasing it by the first resolution of the current image. In another example, the computing device 201 may update the estimated second resolution by a portion of the first resolution of the current image. The second resolution of the enhanced image may be at least the first resolution of the current image of the plurality of images. The computing device 201 may output, for display, the estimated second resolution of the enhanced image. In one example, a user may view the estimated second resolution on a display of the computing device 201. In another example, a user may view the estimated second resolution on a display of the computing device 201 while the computing device 201 is receiving the plurality of images. The computing device 201 may determine that the continuous image capture is disabled. In one example, the computing device 201 may receive a second indication associated with the continuous image capture of the pre determined scene being disabled.

In another embodiment, the computing device 201 may determine that the estimated second resolution of the enhanced image is at least a predetermined resolution. The predetermined resolution may be at least the first resolution of the current image of the plurality of images, set by a user of the computing device 201, at least double the first resolution of the current image of the plurality of images, or the like. In response to determining that the estimated second resolution of the enhanced image is at least the predetermined resolution, the computing device 201 may disable the continuous image capture.

In another embodiment, the computing device 201 may determine that a first duration associated with the continuous image capture of the predetermined scene is at least a predetermined duration. The predetermined duration may be associated with capturing a certain number of images of the plurality of images. In response to determining that the second duration is at least the predetermined duration, the computing device 201 may disable the continuous image capture.

In another embodiment, the computing device 201 may determine that a number of images of the plurality of images received by the computing device 201 is at least a predetermined number of images of the plurality of images. The predetermined number of images of the plurality of images may be associated with performing a burst mode of a camera of the computing device 201, in response to determining that the number of images of the plurality of images received by the computing device 201 is at least the predetermined number of images of the plurality of images, the computing device 201 may disable the continuous image capture of the predetermined scene.

In another embodiment, the computing device 201 may determine that the current image of the plurality of images is non-stationary, which may indicate movement of certain subject matter in the scene. Since the enhanced image may be generated by aligning and combining the plurality of images so that additional image information is obtained, any motion of certain subject matter in the scene may degrade the quality of the enhanced image. Thus, the computing device 201 may detect motion in the current image of the plurality of images and, in response to detecting motion, may disable the continuous image capture of the predetermine scene or may remove the current image from the plurality of images.

In another embodiment, in response to the continuous image capture of the predetermined scene being disabled, the computing device 201 may generate the enhanced image of the predetermined scene using the plurality of images. In one example, the computing device 201 may output, to an image processor, the plurality of images. In response, the computing device 201 may receive, from the image processor, the enhanced image. In another example, the computing device 201 may output, to a computer, the plurality of images. In response, the computing device 201 may receive, from the computer, the enhanced image.

In another embodiment, the computing device 201 may determine a sub-pixel motion vector for the current image of the plurality of images relative to a reference image of the plurality of images. The computing device 201 may decompose all or a portion of the current image of the plurality of images into image blocks, which may also be referred to as macroblocks. In one example, the image block may be four (4) pixels by four (4) pixels, eight (8) pixels by eight (8) pixels, sixteen (16) pixels by sixteen (16) pixels, or the like. In another example, an image may be an image block. The computing device 201 may determine for each image block of the current image a best match to an image block of the reference image. The two-dimensional coordinate shift of each image block of the current image relative to a best image block of the reference image may determine an integer pixel motion vector for the current image. However, during the continuous image capture, an image sensor of the computing device 201, objects in the predetermined scene, or the like may not move in exact integer pixel increments. Instead, the image sensor of the computing device 201 or the objects in the predetermined scene may move in fractional pixel increments. Consequently, the computing device 201 may apply interpolation techniques to determine the sub-pixel motion vector of the current image relative to the reference image. A person of ordinary skill in the art win recognize various techniques for motion estimation. The sub-pixel motion vector may be a two-dimensional vector with each component of the vector having units of 1/N pixel, where N is an integer number. For example, each component of the sub-pixel motion vector may be a half-pixel offset, a third-pixel offset, a quarter-pixel offset, a fifth-pixel offset, a sixth-pixel offset, an eighth-pixel offset, or the like relative to the integer pixel motion vector. In response to the sub-pixel motion vector of the current image of the plurality of images being different from a sub-pixel motion vector of another image of the plurality of images, the computing device 201 may increase the estimated second resolution of the enhanced image. It is important to recognize that a motion vector may include an integer pixel motion vector and a sub-integer pixel motion vector, wherein the sub-integer pixel motion vector is relative to the integer pixel motion vector.

In another embodiment, the computing device 201 may determine an integer-pixel motion vector for a current image of the plurality of images relative to a reference image of the plurality of images. The reference image may be one of the plurality of images. In one example, the reference image may be a first captured image of the plurality of images. In response to the integer pixel motion vector of the current image of the plurality of images being less than a non-stationary threshold, the computing device 201 may increase the estimated second resolution. The non-stationary threshold may be associated with an image sensor of the computing device 201 or objects in the predetermined scene moving during the capture of the current image resulting in the current image not being useful in generating an enhanced image of the predetermined scene.

In another embodiment, the computing device 201 may determine a motion vector for a current image of the plurality of images relative to a reference image of the plurality of images. The reference image may be one of the plurality of images. In one example, the reference image may be a first captured image of the plurality of images. In response to the motion vector of the current image of the plurality of images being less than a non-stationary threshold, the computing device 201 may increase the estimated second resolution. The non-stationary threshold may be associated with an image sensor of the computing device 201 or objects in the predetermined scene moving during the capture of the current image resulting in the current image not being useful in generating an enhanced image of the predetermined scene.

In another embodiment, the computing device 201 may receive an indication of a first action associated with the computing device. In response to the first action, the computing device 201 may enable the continuous image capture of the predetermined scene. In one example, the first action may correspond to a user of the computing device 201 pressing and holding an input device of the computing device 201 associated with a shutter of a camera of the computing device 201 being held open.

In another embodiment, the computing device 201 may receive an indication of a second action associated with the computing device. In response to the second action, the computing device 201 may disable the continuous image capture of the predetermined scene. In one example, the second action may correspond to a user of the computing device 201 releasing an input device of the computing device 201 associated with releasing a shutter of a camera of the computing device 201.

In another embodiment, the computing device 201 may output, to an image processor, a reference image of the plurality of images. Further, the computing device 201 may output, to the image processor, the current image of the plurality of images. In response to outputting the current image of the plurality of images, the computing device 201 may receive, from the image processor, a motion vector, an integer pixel motion vector or a sub-pixel motion vector of the current image of the plurality of images relative to the reference image of the plurality of images.

In another embodiment, the computing device 201 may output, to the computer 203 using the network 211, a reference image of the plurality of images. Further, the computing device 201 may output, to the computer 203 using the network 211, the current image of the plurality of images. In response to outputting the current image of the plurality of images, the computing device 201 may receive, from the computer 203 using the network 211, a motion vector, an integer pixel motion vector or a sub-pixel motion vector of the current image of the plurality of images relative to the reference image of the plurality of images.

Figure 3:
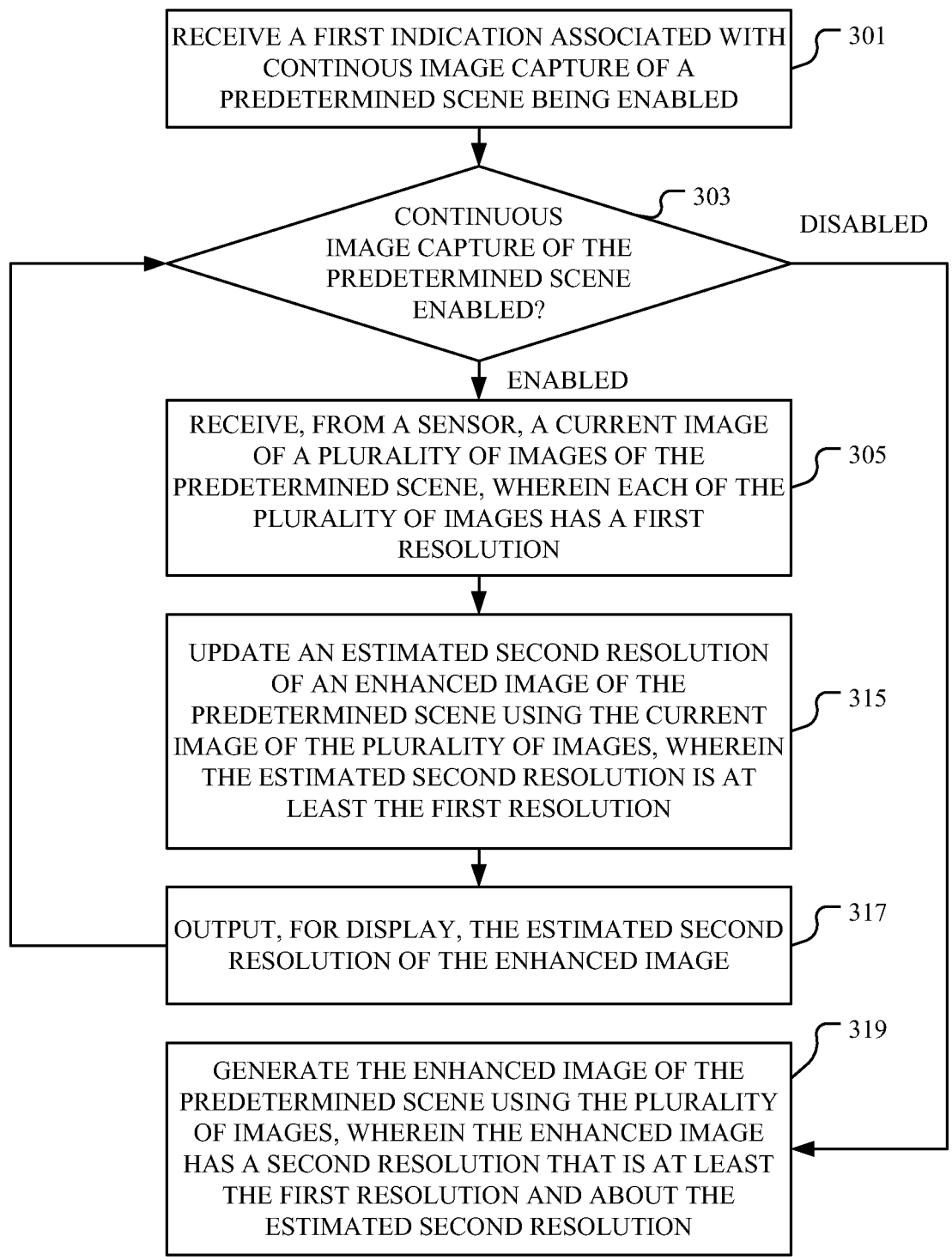
FIG. 3 is a flowchart of one embodiment of a method for generating an enhanced image of a predetermined scene from a plurality of images of the predetermined scene with various aspects described herein.

FIG. 3 is a flowchart of one embodiment of a method 300 for generating an enhanced image of a predetermined scene from a plurality of images of the predetermined scene with various aspects described herein. In FIG. 3, the method 300 may start, for instance, at block 301, where it may include receiving a first indication associated with continuous image capture of the predetermined scene being enabled. At block 303, the method 300 may include determining whether the continuous image capture of the predetermined scene is enabled. If the continuous image capture of the predetermined scene is enabled, at block 305, the method 300 may include receiving, from a sensor such as an image sensor, a current image of the plurality of images of the predetermined scene. Each of the plurality of images may have a first resolution. At block 315, the method 300 may include updating an estimated second resolution of the enhanced image using the current image of the plurality of images. The estimated second resolution of the enhanced image may be at least the first resolution. At block 317, the method 300 may include outputting, for display, the estimated second resolution of the enhanced image. If the continuous image capture of the predetermined scene is disabled, at block 319, the method 300 may include generating an enhanced image using the plurality of images, associating the enhanced image with one of the plurality of images, or the like. Further, the enhanced image may have a second resolution that is at least the first resolution and about the estimated second resolution.

In another embodiment, a method may include receiving a first indication associated with continuous image capture of a predetermined scene being enabled. In one example, the first indication may correspond to a user of the computing device pressing and holding an input device such as a button or a presence-sensitive display of the computing device. In response to the first indication, the method may include enabling the continuous image capture of the predetermined scene.

In another embodiment, a method may include receiving a second indication associated with the continuous image capture of the predetermined scene being disabled. In one example, the second indication may correspond to a user of the computing device releasing the input device of the computing device. In response to the second indication, the method may include disabling the continuous image capture.

In another embodiment, a method may include outputting, to an image processor, the plurality of images. In response, the method may include receiving, from the image processor, the enhanced image.

In another embodiment, a method may include outputting, to a computer such as over a network, the plurality of images. In response, the method may include receiving, from the computer, the enhanced image.

In another embodiment, each of the plurality of images may be a sequential image of the predetermined scene.

In another embodiment, each of the plurality of images may be a raw image.

In another embodiment, a method may include determining a sub-pixel motion vector for the current image of the plurality of images relative to a reference image of the plurality of images. In response to the sub-pixel motion vector of the current image of the plurality of images being different from a sub-pixel motion vector of a previous image of the plurality of images, the method may include increasing the estimated second resolution of the enhanced image. Each sub-pixel motion vector of the plurality of images may be relative to a reference image of the plurality of images.

In another embodiment, a method may include outputting, to an image processor, a reference image of the plurality of reference images. Further, the method may include outputting, to an image processor, the current image of the plurality of images. In response to outputting the current image of the plurality of images, the method may include receiving, from the image processor, a motion vector, an integer pixel motion vector, or a sub-pixel motion vector of the current image of the plurality of images relative to the reference image of the plurality of images.

In another embodiment, a method may include determining a sub-pixel motion vector for the current image of the plurality of images relative to a reference image of the plurality of images. In response to the sub-pixel motion vector of the current image of the plurality of images being less than a non-stationary threshold, the method may include increasing the estimated second resolution of the enhanced image.

In another embodiment, a method may include increasing the estimated second resolution of the enhanced image by the first resolution.

In another embodiment a method may include increasing the estimated second resolution of the enhanced image by a predetermined resolution associated with the first resolution. In one example, the predetermined resolution may be N times the first resolution, wherein N is a whole number. In another example, the predetermined resolution may be configurable by a user of a computing device.

In another embodiment, a method may include, in response to determining that the estimated second resolution of the enhanced image is at least a predetermined resolution, disabling the continuous image capture.

In another embodiment, a method may include, in response to determining that the continuous image capture is performed for a predetermined duration, disabling the continuous image capture. In one example, the predetermined duration may be about one (1) second. In another example, the predetermined duration may be in the range of about one hundred milliseconds (100 msec.) to about five (5) seconds.

In another embodiment, a method may include determining a sub-pixel motion vector for the current image of the plurality of images relative to a reference image of the plurality of images. In response to the sub-pixel motion vector of the current image of the plurality of images being associated with a sub-pixel motion vector of a previous image of the plurality of images, the method may include removing the current image from the plurality of images. Each sub-pixel motion vector of the plurality of images may be relative to the reference images of the plurality of images.

In another embodiment, a method may include, in response to determining that a current image of the plurality of images is non-stationary, disabling the continuous image capture.

In another embodiment, a method may include, in response to determining that a current image of the plurality of images is non-stationary, removing the current image from the plurality of images.

In another embodiment, a method may include determining an integer pixel motion vector for a current image of the plurality of images relative to a reference image of the plurality of images. Further, the method may include determining that the integer pixel motion vector of the current image of the plurality of images is at least a non-stationary threshold. In response, the method may include disabling the continuous image capture, removing the current image from the plurality of images, or the like.

In another embodiment, the sensor may be an image sensor.

In another embodiment, a method may include determining a sub-pixel motion vector for the current image of the plurality of images relative to a reference image of the plurality of images. The method may include decomposing all or a portion of the current image of the plurality of images into image blocks, which may also be referred to as macroblocks. In one example, the image block may be four (4) pixels by four (4) pixels, eight (8) pixels by eight (8) pixels, sixteen (16) pixels by sixteen (16) pixels, or the like. In another example, an image may be an image block. The method may include determining for each image block of the current image a best match to an image block of the reference image. The two-dimensional coordinate shift of each image block of the current image relative to a best image block of the reference image may determine an integer pixel motion vector for the current image. However, during the continuous image capture, an image sensor of a computing device, objects in the predetermined scene, or the like may not move in exact integer pixel increments. Instead, the image sensor of the computing device or the objects in the predetermined scene may move in fractional pixel increments. Consequently, the method may include applying interpolation techniques to determine the sub-pixel motion vector of the current image block relative to the reference image block. A person of ordinary skill in the art will recognize various techniques for performing motion estimation. The sub-pixel motion vector may be a two-dimensional vector with each component of the vector having units of 1/N pixel, where N is an integer number. For example, each component of the sub-pixel motion vector may be a half-pixel offset, a third-pixel offset, a quarter-pixel offset, a fifth-pixel offset, a sixth-pixel offset, an eighth-pixel offset, or the like relative to the integer pixel motion vector. In response to the sub-pixel motion vector of the current image of the plurality of images being different from a sub-pixel motion vector of another image of the plurality of images, the method may include increasing the estimated second resolution of the enhanced image. It is important to recognize that a motion vector may include an integer pixel motion vector and a sub-integer pixel motion vector, wherein the sub-integer pixel motion vector is relative to the integer pixel motion vector.

Figure 4:
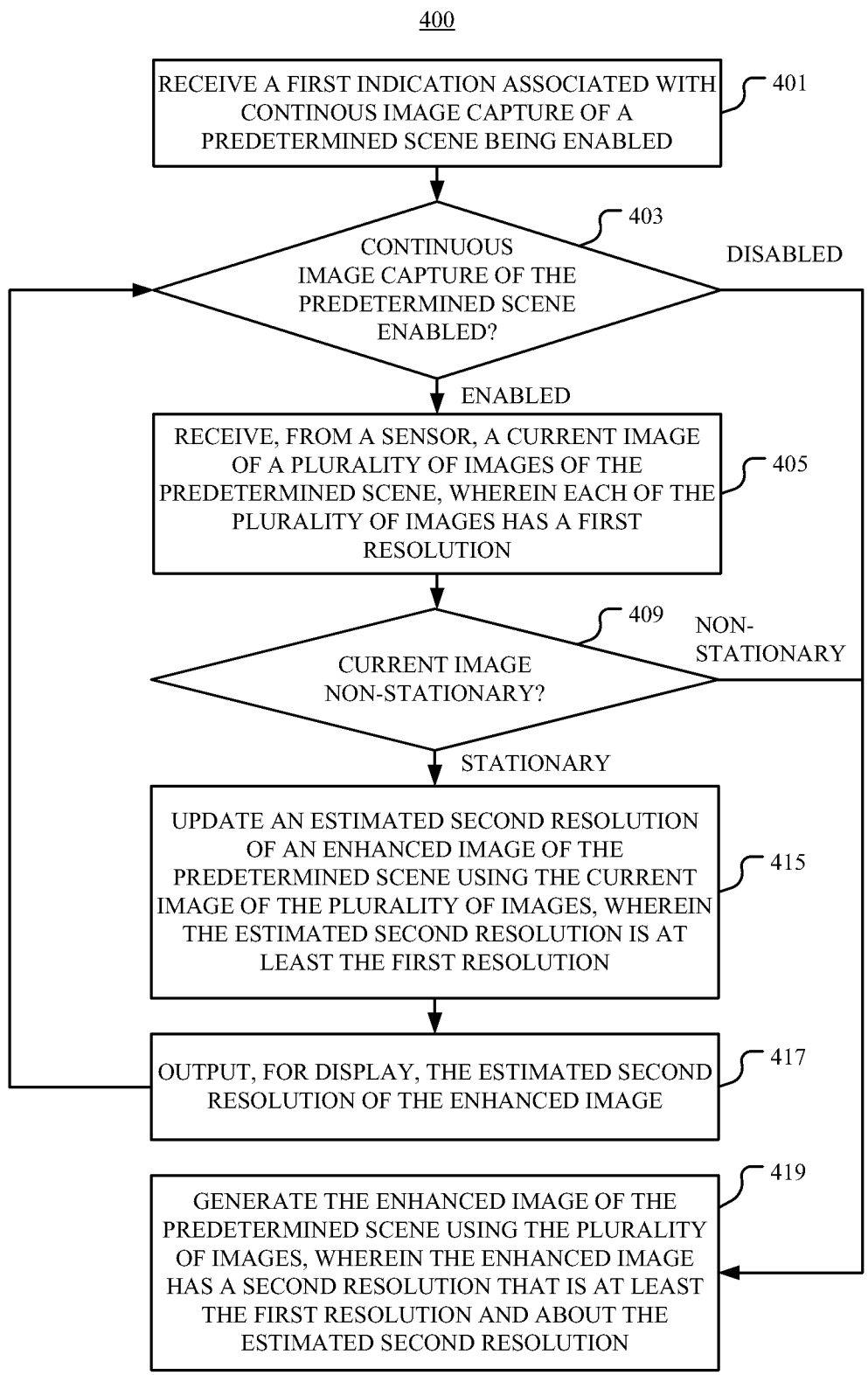
FIG. 4 is a flowchart of another embodiment of a method for generating an enhanced image of a predetermined scene from a plurality of images of the predetermined scene with various aspects described herein.

FIG. 4 is a flowchart of another embodiment of a method 400 for generating an enhanced image of a predetermined scene from a plurality of images of the predetermined scene with various aspects described herein. In FIG. 4, the method 400 may start, for instance, at block 401, where it may include receiving a first indication associated with continuous image capture of the predetermined scene being enabled. At block 403, the method 400 may include determining whether the continuous image capture of the predetermined scene is enabled. If the continuous image capture of the predetermined scene is enabled, at block 405, the method 400 may include receiving, from a sensor such as an image sensor, a current image of the plurality of images associated with the predetermined scene. Each of the plurality of images may have a first resolution. At block 409, the method may include determining whether the current image of the plurality of images is non-stationary. If the current image of the plurality of images is stationary, at block 415, the method 400 may include updating an estimated second resolution of the enhanced image of the predetermined scene using the current image of the plurality of images. The second resolution of the enhanced image may be at least the first resolution. At block 417, the method 400 may include outputting, for display, the estimated second resolution of the enhanced image. If the continuous image capture of the predetermined scene is disabled or the current image of the plurality of images is non-stationary, at block 419, the method 400 may include generating an enhanced image of the predetermined scene using a plurality of images, associating the enhanced image of the predetermined scene with one of the plurality of images, or the like. Further, the enhanced image has a second resolution that may be at least the first resolution and about the estimated second resolution.

Figure 5:
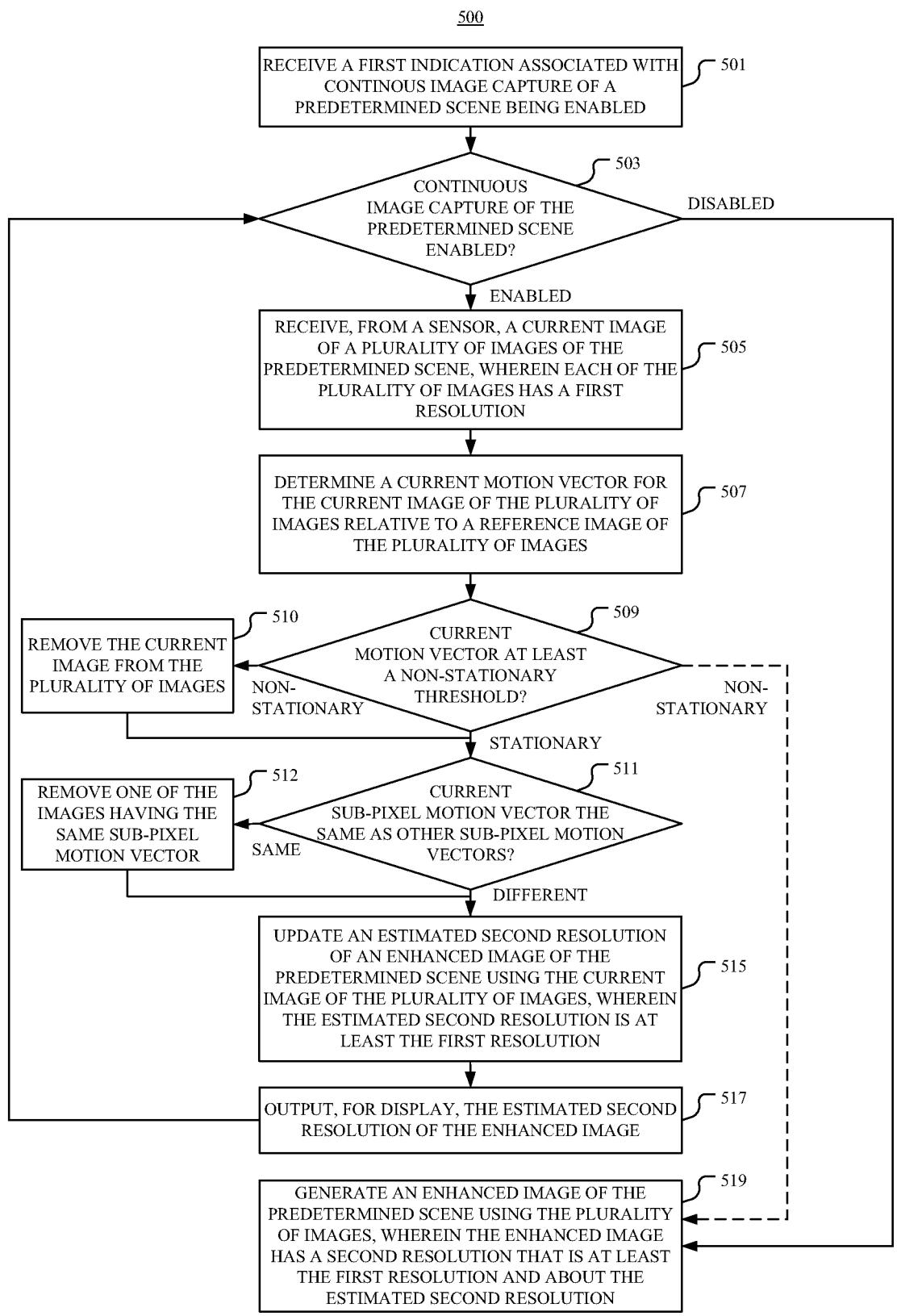
FIG. 5 is a flowchart of another embodiment of a method for generating an enhanced image of a predetermined scene from a plurality of images of the predetermined scene with various aspects described herein.

FIG. 5 is a flowchart of another embodiment of a method 500 for generating an enhanced image of a predetermined scene from a plurality of images of the predetermined scene with various aspects described herein. In FIG. 5, the method 500 may start, for instance, at block 501, where it may include receiving a first indication associated with continuous image capture of the predetermined scene being enabled. At block 503, the method 500 may include determining whether the continuous image capture of the predetermined scene is enabled. If the continuous image capture of the predetermined scene is enabled, at block 505, the method 500 may include receiving, from a sensor such as an image sensor, a current image of the plurality of images associated with the predetermined scene. Each of the plurality of images may have a first resolution. At block 507, the method 500 may include determining a current motion vector for the current image of the plurality of images relative to a reference image of the plurality of images. Each motion vector of the plurality of images may be determined relative to the reference image of the plurality of images.

In FIG. 5, at block 509, the method 500 may include determining whether the current motion vector of the current image of the plurality of images is at least a non-stationary threshold. If the current motion vector is at least the non-stationary threshold, at block 510 the method 500 may include removing the current image from the plurality of images. Otherwise, if the current motion vector is less than the non-stationary threshold, at block 511, the method 500 may include determining whether the sub-pixel motion vector of the current image of the plurality of images is the same as a sub-pixel motion vector of another image of the plurality of images. If the current sub-pixel motion vector is the same as the sub-pixel motion vector of the other image, at block 512, the method 500 may include removing one of the current image and the other image from the plurality of images. In one example, the method 500 may include removing the other image having the same sub-pixel motion vector from the plurality of images. In another example, the method 500 may include removing the current image having the same sub-pixel motion vector from the plurality of images. In another example, the method 500 may include comparing the current image having the same sub-pixel motion vector to the reference image to generate a first difference. Further, the method 500 may include comparing the other image having the same sub-pixel motion vector to the reference image to generate a second difference. Finally, in response to determining that the first difference is less than the second difference, the method 500 may include removing the other image from the plurality of images.

Otherwise, if the current sub-pixel motion vector is different from the other sub-pixel motion vectors, at block 515, the method 500 may include updating an estimated second resolution of an enhanced image of the predetermined scene using the current image of the plurality of images. The second resolution of the enhanced image may be at least the first resolution. At block 517, the method 500 may include outputting, for display, the estimated second resolution of the enhanced image and may return to block 503. If the continuous image capture of the predetermined scene is disabled, at block 519, the method 500 may include generating the enhanced image of the predetermined scene using the plurality of images, may associate the enhanced image of the predetermined scene with one of the plurality of images, or the like. The enhanced image may have a second resolution that is at least the first resolution and about the estimated second resolution. The method 500 may include generating the enhanced image by aligning and combining the plurality of images so that additional image information is obtained.

In another embodiment, a method may include determining a motion vector for each image block of a current image relative to a reference image. The method may include determining whether the motion vector of each image block of the current image is at least a non-stationary threshold. If the motion vector of a particular image block is at least the non-stationary threshold, the method may include removing the particular image block from the current image. By performing such method using image blocks may reduce the impact of, for instance, a bird flying through a predetermined scene.

In another embodiment, a method may include determining a motion vector for each image block of the current image relative to a reference image. The method may include determining whether the sub-pixel motion vector of the particular image block of the current image is the same as a sub-pixel motion vector of a corresponding image block of another image. If the sub-pixel motion vector of the particular image block of the current image is the same as the sub-pixel motion vector of the corresponding image block of the other image, the method may include removing one of the particular image block of the current image and the corresponding image block of the other image. In one example, the method may include removing the corresponding image block having the same sub-pixel motion vector from the other image. In another example, the method may include removing the particular image block having the same sub-pixel motion vector from the current image. In another example, the method may include comparing the particular image block of the current image to a corresponding image block of the reference image to generate a first difference. Further, the method may include comparing the corresponding image block of the other image to the corresponding image block of the reference image to generate a second difference. Finally, in response to determining that the first difference is less than the second difference, the method may include removing the corresponding image block from the other image.

In another embodiment, a method may include updating an estimated second resolution of an enhanced image of the predetermined scene using one or more image blocks of a current image.

In another embodiment, a method may include generating an enhanced image of the predetermined scene using image blocks of a plurality of images. Further, the method may include generating the enhanced image by aligning and combining the image blocks of the plurality of images using their motion vectors so that additional image information is obtained.

In another embodiment, a method may include, in response to determining that the current motion vector of the current image of the plurality of images is at least the non-stationary threshold, disabling the continuous image capture of the predetermined scene.

Figure 6:
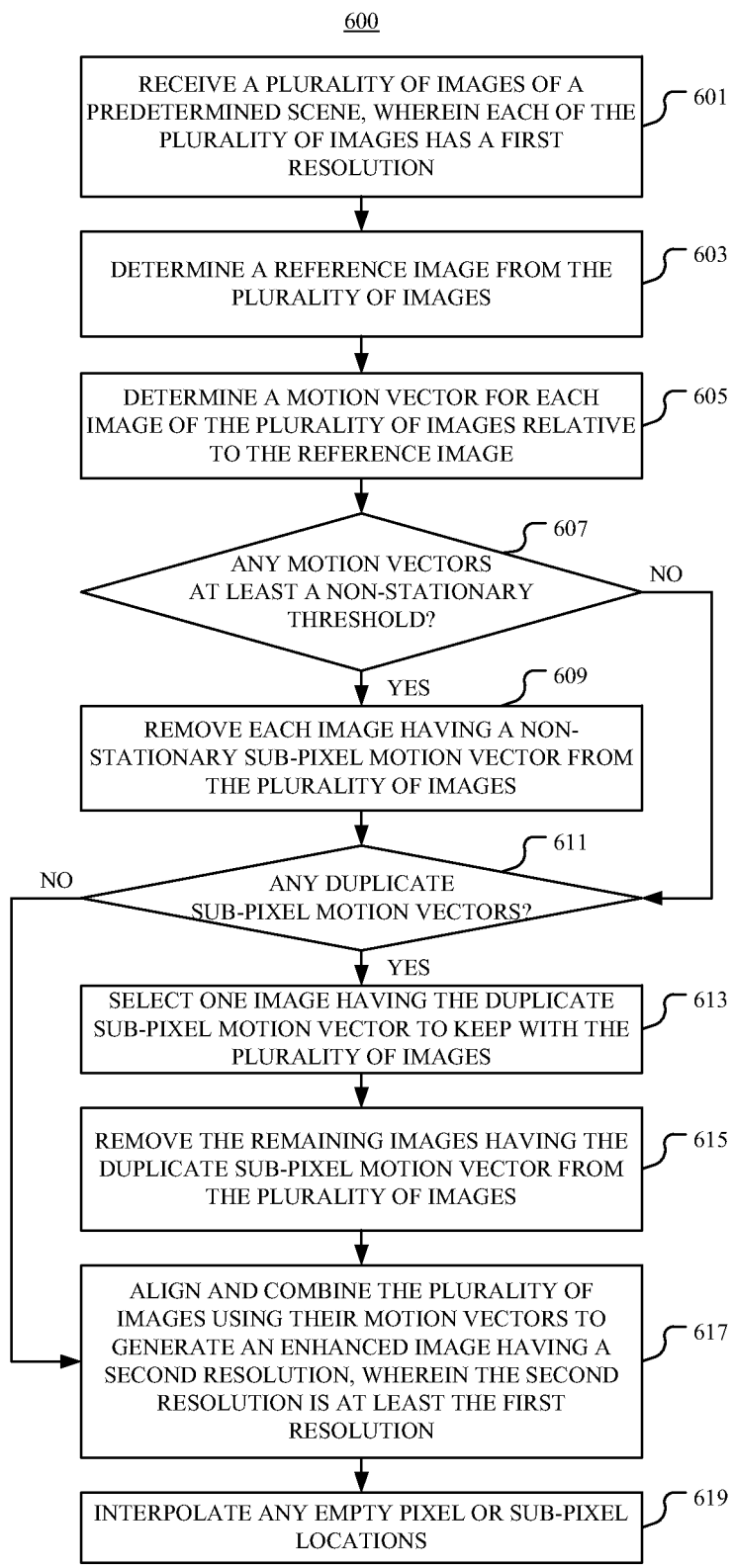
FIG. 6 is a flowchart of another embodiment of a method for generating an enhanced image of a predetermined scene from a plurality of images of the predetermined scene with various aspects described herein.

FIG. 6 is a flowchart of another embodiment of a method 600 for generating an enhanced image of a predetermined scene from a plurality of images of the predetermined scene with various aspects described herein. In FIG. 6, the method 600 may start, for instance, at block 601, where it may include receiving a plurality of images of the predetermined scene. Each of the plurality of images may have a first resolution. At block 603, the method 600 may determine a reference image from the plurality of images. At block 605, the method 600 may determine a motion vector for each image of the plurality of images relative to the reference image of the plurality of images. The motion vector may include an integer pixel motion vector and a sub-pixel motion vector. At block 607, the method 600 may include determining whether any motion vectors of the plurality of images is at least a non-stationary threshold. At block 609, the method 600 may include removing each image having a non-stationary motion vector from the plurality of images. At block 611, the method 600 may include determining whether any of the plurality of images has the same sub-pixel motion vector. If any of the plurality of images has the same sub-pixel motion vector, at block 613, the method 600 may include selecting one of the plurality of images having the same sub-pixel motion vector. Further, at block 615, the method 600 may include removing the other images having the same sub-pixel motion vector from the plurality of images.

In FIG. 6, at block 617, the method 600 may include aligning and combining the plurality of images using their motion vectors to generate an enhanced image. The method 600 may use the motion vector of each of the plurality of images to align itself relative to the reference image of the plurality of images. Further, the method 600 may need to radially align one or more of the plurality of images relative to the reference image of the plurality of images. A person of ordinary skill will recognize various techniques for aligning and combining the plurality of images using motion vectors. After aligning and combining the plurality of images using the motion vectors to form an enhanced image, the method 600 may include determining that the enhanced image has empty pixel locations or sub-pixel locations. In response, at block 619, the method 600 may perform interpolation using surrounding pixel locations or sub-pixel locations to determine the empty pixel locations or the empty sub-pixel locations. In one example, the method 600 may use non-adaptive interpolation algorithms such as nearest neighbor, bilinear, bicubic, spline, sine, lanczos, or the like. In another example, the method 600 may use adaptive interpolation algorithms to minimize interpolation artifacts. A person of ordinary skill will recognize various techniques for interpolating an image.

Figure 7:
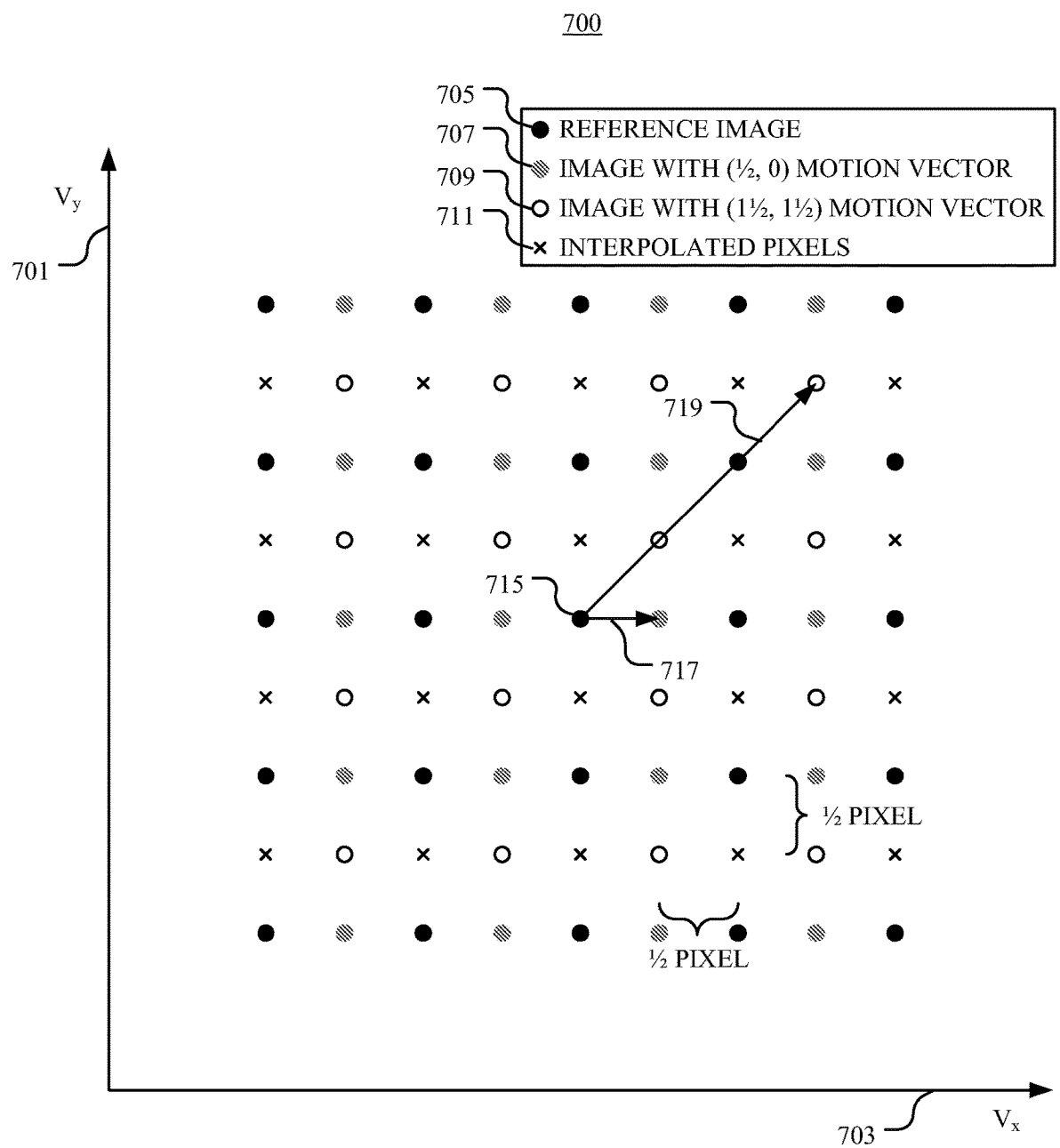
FIG. 7 provides an example of a two-dimensional grid used to generate an enhanced image of a predetermined scene from a plurality of images of the predetermined scene in accordance with various aspects described herein.

FIG. 7 provides an example of a two-dimensional grid 700 used to generate an enhanced image of a predetermined scene from a plurality of images of the predetermined scene in accordance with various aspects described herein. Each of the plurality of images may have a first resolution. In FIG. 7, the grid 700 of the enhanced image may include about four (4) times more pixel locations than each of the plurality of images. Thus, a second resolution of the enhanced image may be up to about four (4) times greater than the first resolution of each of the plurality of images. An ordinate 701 describes a first dimension of the grid 700 such as a y-axis or a vertical axis. An abscissa 703 describes a second dimension of the grid 700 such as an x-axis or a horizontal axis. A reference image 705 of the plurality of images may be positioned on the grid 700 at, for instance, integer pixel locations. A first image 707 of the plurality of images with a first motion vector 717 having a half pixel offset along the abscissa 703 relative to the reference image 705 may be positioned on the grid 700. Further, a second image 709 of the plurality of images with a second motion vector 719 having a one and a half pixel offset along the ordinate 701 and a half pixel offset along the abscissa 703 relative to the reference image 705 may be positioned on the grid 700. A pixel value for each empty pixel location or sub-pixel location may be determined by performing interpolation using pixel values of surrounding pixel or sub-pixel locations to generate the interpolated pixels 711.

Figure 8:
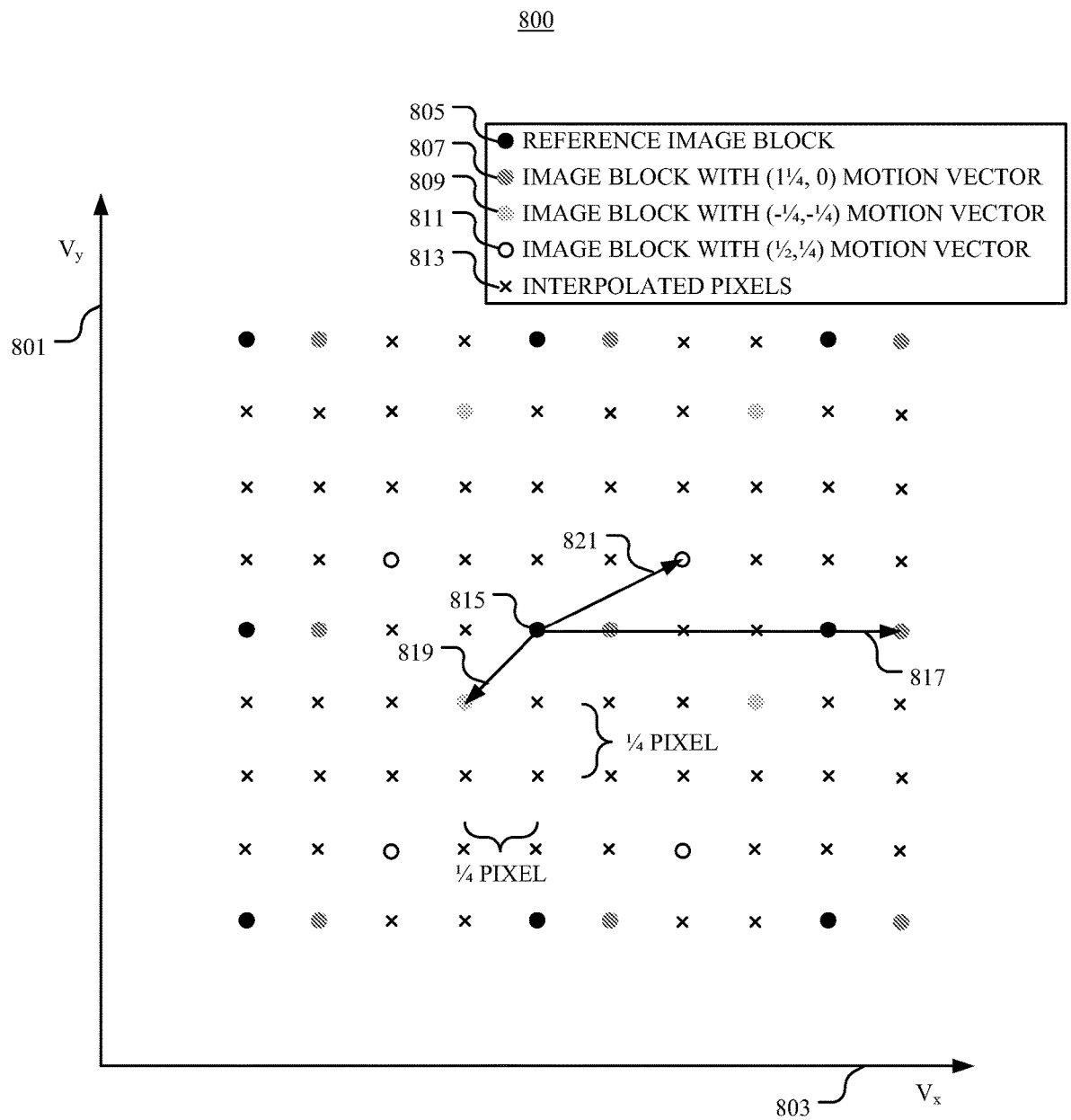
FIG. 8 provides another example of a two-dimensional grid used to generate an enhanced image of a predetermined scene from a plurality of images of the predetermined scene in accordance with various aspects described herein.

FIG. 8 provides another example of a two-dimensional grid 800 used to generate an enhanced image of a predetermined scene from a plurality of images of the predetermined scene in accordance with various aspects described herein. Each of the plurality of images may have a first resolution. In FIG. 8, the grid 800 of the enhanced image may include about sixteen (16) times more pixel locations than each of the plurality of images. Thus, the second resolution of the enhanced image may be up to about sixteen (16) times greater than the first resolution of each of the plurality of images. Further, the enhanced image may be composed of a plurality of image blocks. An ordinate 801 describes a first dimension of the grid 800 such as a y-axis or a vertical axis. An abscissa 803 describes a second dimension of the grid 800 such as an x-axis or a horizontal axis. An image block 805 of a plurality of image blocks of a reference image may be positioned on the grid 800. An associated image block 807 of a plurality of image blocks of a first image with a first motion vector 817 having a one and a quarter pixel offset along the abscissa 803 relative to the reference image block 805 may be positioned on the grid 800. Further, an associated image block 809 of a plurality of image blocks of a second image with a second motion vector 819 having a negative quarter pixel offset along the ordinate 801 and a negative quarter pixel offset along the abscissa 803 relative to the reference image block 805 may be positioned on the grid 800. Further, an associated image block 811 of a plurality of image blocks of a third image with a third motion vector 821 having a quarter pixel offset along the ordinate 801 and a half pixel offset along the abscissa 803 relative to the reference image block 805 may be positioned on the grid 800. After aligning and combining the images, a pixel value for each empty pixel location or sub-pixel location may be determined by performing interpolation using pixel values of surrounding pixel or sub-pixel locations to generate the interpolated pixels 813.

In another embodiment, a number of a plurality of images of a predetermined scene may be used to determine a size of the enhanced image.

In another embodiment, a number of a plurality of images of a predetermined scene may be used to determine an interpolation rate of a reference image of the plurality of images.

It is important to recognize that it is impractical to describe every conceivable combination of components or methodologies for purposes of describing the claimed subject matter. However, a person having ordinary skill in the art will recognize that many further combinations and permutations of the subject technology are possible. Accordingly, the claimed subject matter is intended to cover all such alterations, modifications and variations that are within the spirit and scope of the claimed subject matter.

In the foregoing specification, specific embodiments have been described. However, one of ordinary skill in the art will appreciate that various modifications and changes may be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. This disclosure is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" or the like does not, without more constraints, preclude the existence of additional identical elements in the process, method, article, or apparatus that comprises, has, includes, contains the element. The terms "a," "an," and "the" are defined as one or more unless explicitly stated otherwise herein. The term "or" is intended to mean an inclusive "or" unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

Furthermore, the term "connected" means that one function, feature, structure, component, element, or characteristic is directly joined to or in communication with another function, feature, structure, component, element, or characteristic. The term "coupled" means that one function, feature, structure, component, element, or characteristic is directly or indirectly joined to or in communication with another function, feature, structure, component, element, or characteristic. References to "one embodiment," "an embodiment," "example embodiment," "various embodiments," and other like terms indicate that the embodiments of the disclosed technology so described may include a particular function, feature, structure, component, element, or characteristic, but not every embodiment necessarily includes the particular function, feature, structure, component, element, or characteristic. Further, repeated use of the phrase "in one embodiment" does not necessarily refer to the same embodiment, although it may.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches may be used. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

This detailed description is merely illustrative in nature and is not intended to limit the present disclosure, or the application and uses of the present disclosure. Furthermore, there is no intention to be bound by any expressed or implied theory presented in the preceding field of use, background, or this detailed description. The present disclosure provides various examples, embodiments and the like, which may be described herein in terms of functional or logical block elements. Various techniques described herein may be used for generating an enhanced image of a predetermined scene from a plurality of images of the predetermined scene. The various aspects described herein are presented as methods, devices (or apparatus), systems, or articles of manufacture that may include a number of components, elements, members, modules, nodes, peripherals, or the like. Further, these methods, devices, systems, or articles of manufacture may include or not include additional components, elements, members, modules, nodes, peripherals, or the like. Furthermore, the various aspects described herein may be implemented using standard programming or engineering techniques to produce software, firmware, hardware, or any combination thereof to control a computing device to implement the disclosed subject matter. The term "article of manufacture" as used herein is intended to encompass a computer program accessible from any computing device, carrier, or media. For example, a non-transitory computer-readable medium may include: a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the claimed subject matter.

What is claimed is:

1. A method, comprising:
   determining that a user input is received by a presence-sensitive input device, wherein the user input is provided using a finger, a stylus, or an object associated with a user;
   in response to determining that the user input is received, capturing a reference image and a first image, wherein each of the reference image and the first image is of a scene and has a first resolution;
   determining an estimated resolution of an enhanced image of the scene based on the reference image and the first image; and
   in response to completing the capturing of the reference image and the first image, determining the enhanced image using the reference image and the first image, wherein the enhanced image has at least the estimated resolution, wherein the estimated resolution is at least as high as the first resolution.

2. The method of claim 1, wherein the user input is pressure, an eye movement, an eye lid movement, or a facial expression.

3. The method of claim 2, wherein the presence-sensitive input device is at least one of a digital camera, a digital video camera, or a depth camera.

4. The method of claim 1, wherein the object associated with the user is an eye, an eye lid, or a portion of a face at which a facial expression is detected.

5. The method of claim 1, wherein determining the estimated resolution of the enhanced image of the scene using the reference image and the first image includes:
   determining a motion vector for a particular image block of the first image relative to a corresponding block of the reference image; and
   in response to determining that the motion vector of the particular image block of the first image is less than a non-stationary threshold, determining a higher estimated resolution of the enhanced image that corresponds to a size of the particular image block of the first image.

6. The method of claim 5, wherein determining the motion vector for the particular image block of the first image relative to the reference image includes:
   outputting, from the presence-sensitive input device, to an image processor, the particular image block of the first image;
   outputting, from the presence-sensitive input device, to the image processor, a corresponding image block of the reference image; and
   after outputting the particular image block of the first image and the corresponding image block of the reference image, receiving, by the presence-sensitive input device, from the image processor, the motion vector of the particular image block of the first image relative to the reference image.

7. The method of claim 1, wherein the first image includes a plurality of images, each captured at a different time.

8. The method of claim 7, wherein determining the estimated resolution of the enhanced image of the scene using the reference image and the first image includes:
   determining a sub-pixel motion vector for each of the plurality of images relative to the reference image;
   aligning and combining pixels from the plurality of images using corresponding sub-pixel motion vectors to form the enhanced image; and
   in response to identifying an empty sub-pixel location in the enhanced image, interpolating the enhanced image to determine a pixel value for the empty sub-pixel location.

9. The method of claim 8, wherein determining the sub-pixel motion vector for each of the plurality of images relative to the reference image includes:
   decomposing at least a portion of each of the plurality of images into macroblocks, wherein each macroblock includes a set of pixels;
   determining, for each macroblock, a match to an image block of the reference image; and
   performing interpolation to determine the sub-pixel motion vector.

10. A presence-sensitive input device comprising:
   a memory configured to store data and computer-executable instructions; and
   a processor operatively coupled to the memory, wherein the processor is configured to access the memory to retrieve the computer-executable instructions that, when executed by the processor cause the processor to:
      determine that a user input is received by a presence-sensitive input device, wherein the user input is provided using a finger, a stylus, or an object associated with a user;
      in response to determining that the user input is received, capture a reference image and a first image, wherein each of the reference image and the first image is of a scene and has a first resolution;
      determine an estimated resolution of an enhanced image of the scene based on the reference image and the first image; and
      in response to completing the capture of the reference image and the first image, determine the enhanced image using the reference image and the first image, wherein the enhanced image has at least the estimated resolution, wherein the estimated resolution is at least as high as the first resolution.

11. The presence-sensitive input device of claim 10, wherein the user input is pressure, an eye movement, an eye lid movement, or a facial expression.

12. The presence-sensitive input device of claim 10, wherein the presence-sensitive input device is at least one of a digital camera, a digital video camera, or a depth camera.

13. The presence-sensitive input device of claim 10, wherein determining the estimated resolution of the enhanced image of the scene using the reference image and the first image includes:
   determining a motion vector for a particular image block of the first image relative to a corresponding block of the reference image; and
   in response to determining that the motion vector of the particular image block of the first image is less than a non-stationary threshold, determining a higher estimated resolution of the enhanced image that corresponds to a size of the particular image block of the first image.

14. The presence-sensitive input device of claim 13, wherein determining the motion vector for the particular image block of the first image relative to the reference image includes:
   outputting, from the presence-sensitive input device, to an image processor, the particular image block of the first image;
   outputting, from the presence-sensitive input device, to the image processor, a corresponding image block of the reference image; and
   after outputting the particular image block of the first image and the corresponding image block of the reference image, receiving, by the presence-sensitive input device, from the image processor, the motion vector of the particular image block of the first image relative to the reference image.

15. A non-transitory computer readable medium with instructions stored thereon that, when executed by one or more computers, cause the one or more computers to perform operations comprising:
   determining that a user input is received by a presence-sensitive input device, wherein the user input is provided using a finger, a stylus, or an object associated with a user;
   in response to determining that the user input is received, capturing a reference image and a first image, wherein each of the reference image and the first image is of a scene and has a first resolution;
   determining an estimated resolution of an enhanced image of the scene based on the reference image and the first image; and
   in response to completing the capturing of the reference image and the first image, determining the enhanced image using the reference image and the first image, wherein the enhanced image has at least the estimated resolution, wherein the estimated resolution is at least as high as the first resolution.

16. The computer readable medium of claim 15, wherein the user input is pressure, an eye movement, an eye lid movement, or a facial expression.

17. The computer readable medium of claim 15, wherein the presence-sensitive input device is at least one of a digital camera, a digital video camera, or a depth camera.

18. The computer readable medium of claim 15, wherein determining the estimated resolution of the enhanced image of the scene using the reference image and the first image includes:
   determining a motion vector for a particular image block of the first image relative to a corresponding block of the reference image; and
   in response to determining that the motion vector of the particular image block of the first image is less than a non-stationary threshold, determining a higher estimated resolution of the enhanced image that corresponds to a size of the particular image block of the first image.

19. The computer readable medium of claim 18, wherein determining the motion vector for the particular image block of the first image relative to the reference image includes:
   outputting, from the presence-sensitive input device, to an image processor, the particular image block of the first image;
   outputting, from the presence-sensitive input device, to the image processor, a corresponding image block of the reference image; and
   after outputting the particular image block of the first image and the corresponding image block of the reference image, receiving, by the presence-sensitive input device, from the image processor, the motion vector of the particular image block of the first image relative to the reference image.

20. The computer readable medium of claim 15, wherein the first image includes a plurality of images, each captured at a different time and determining the estimated resolution of the enhanced image of the scene using the reference image and the first image includes:

determining a sub-pixel motion vector for each of the plurality of images relative to the reference image;

aligning and combining pixels from the plurality of images using corresponding sub-pixel motion vectors to form the enhanced image; and in response to identifying an empty sub-pixel location in the enhanced image, interpolating the enhanced image to determine a pixel value for the empty sub-pixel location.

* * * * *